(12) United States Patent
Saitoh

(10) Patent No.: US 6,390,459 B2
(45) Date of Patent: May 21, 2002

(54) FLUID-SEALED ANTI-VIBRATION DEVICE

(75) Inventor: Jun Saitoh, Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 0 days.

(21) Appl. No.: 09/739,803

(22) Filed: Dec. 20, 2000

(30) Foreign Application Priority Data

Dec. 24, 1999 (JP) ............................................. 11-368073
Aug. 31, 2000 (JP) ........................................ 2000-263529

(51) Int. Cl.$^7$ ................................................. F16F 5/00
(52) U.S. Cl. ................................................. 267/140.13
(58) Field of Search ....................... 267/140.11–140.15, 267/219; 298/562, 566; 180/300, 312, 903

(56) References Cited

U.S. PATENT DOCUMENTS

| 4,383,679 A | 5/1983 | Kakimoto |
| 5,386,977 A | 2/1995 | Quast |
| 5,865,428 A | * 2/1999 | Kojima .................. 267/140.14 |

FOREIGN PATENT DOCUMENTS

| DE | 31 36 305 | 3/1983 |
| DE | 197 10 138 | 10/1998 |
| EP | 0 245 220 | 11/1987 |
| EP | 0277056 A1 | 8/1988 |
| EP | 0 365 516 | 4/1990 |
| EP | 0 412 322 | 2/1991 |
| EP | 0 489 638 | 6/1992 |
| FR | 2686957 | 8/1993 |
| GB | 2268566 A | 1/1994 |
| JP | 58054249 | 3/1983 |
| JP | 61084431 | 4/1986 |
| JP | 10281214 | 10/1998 |
| WO | WO 99/30956 | 6/1999 |

* cited by examiner

Primary Examiner—Paul N. Dickson
Assistant Examiner—C. T. Bartz
(74) Attorney, Agent, or Firm—Birch, Stewart, Kolasch & Birch, LLP

(57) ABSTRACT

A first connecting member is connected to a second connecting member by an elastic body member. A fluid chamber which is formed inside the first connecting member, the second connecting member and the elastic body member is divided into a main fluid chamber 17 and a sub-fluid chamber 18 by a partition member 15. An idle orifice 20 and a damping orifice 21 communicate with both chambers. In a part of a side wall member 9 which forms the main fluid chamber 17 is formed a round hole 10 which is covered by a part of the elastic body member to form a horizontally movable membrane 11. A circular wall 44 is integrally formed with the partition member 15 to face the horizontal movable membrane 11 at predetermined intervals. Resonance of the horizontal membrane 11 generated as a result of fluctuations of internal pressure in the main fluid chamber is controlled by the circular wall 44.

8 Claims, 14 Drawing Sheets to atmosphere or negative pressure source

FLUID-SEALED ANTI-VIBRATION DEVICE

BACKGROUND OF THE INVENTION

1. Field of the Invention

The present invention relates to a fluid-sealed anti-vibration device suitable for use in an engine mount for an automobile and the like.

2. Description of the Prior Art

A fluid-sealed anti-vibration device is known in the prior art wherein an elastic horizontal movable membrane is provided in a part of a side wall member which encloses a main fluid chamber to absorb the change of internal pressure in the main fluid chamber (one example, Japanese Unexamined Patent Publication No. Hei 10-281214).

Moreover, a fluid-sealed anti-vibration device is known in the prior art wherein an elastic membrane is formed as a circular member and the fluctuation of fluid pressure in a main fluid chamber can be absorbed by elastic deformation of the elastic membrane. The elastic membrane is integrally provided with a stopper projection serving as a circular wall. The stopper projection is formed on the surface of the elastic membrane on a sub-fluid chamber side. In the case of elastic deformation above a predetermined level, in particular, a spring constant is non-linearly changed by allowing the stopper projection to abut a partition member and the like.

In the case where such a horizontal movable membrane is provided, the dynamic spring constant can be generally lowered, but as shown by a dashed line in FIG. 6, a peak of the dynamic spring constant is in a medium frequency range. It is considered that this peak is generated as a reaction to the resonance of the horizontal movable membrane (the peak which is a maximum value of such a dynamic spring constant is hereinafter referred to as "dynamic spring peak", while the minimum value is referred to as "dynamic spring bottom").

SUMMMARY OF THE INVENTION

It is an object of the present invention to control the resonance of a horizontal movable membrane so that generation of the dynamic spring peak can be controlled. In the present invention, a frequency below 500 Hz is defined as low frequency, a frequency between 100 and 500 Hz is defined as medium frequency, and a frequency above 500 Hz is defined as high frequency. In each graph in FIG. 6 and the like, the abscissa is the frequency, and the ordinate is the dynamic spring constant (absolute value of complex spring constant).

When an elastic membrane is provided in a partition member, there is a case where a circular elastic membrane can not be disposed due to layout conditions and must be changed to a non-circular member with a long side section and a short side section such as an oval shaped member. However, if the conventional circular elastic membrane is simply changed to a non-circular member such as that with an oval shape and the like, there is some possibility that the elastic membrane must be retained by the elastic membrane along the long side section for a long period of time, and since the stopper projection continues circularly, the elastic membrane can not be easily bent in response to the fluctuation of fluid pressure of a main fluid chamber. As a result, it is difficult to absorb the increase in the internal pressure. It is therefore an object of the present invention to provide an improved elastic membrane which can be easily bent in response to the fluctuation from increase in the internal pressure and absorb the increase in internal pressure even though the non-circular elastic membrane is used, in which when the elastic deformation exceeds a predetermined level, a spring constant can be changed non-linearly in the same manner as the prior art.

The primary object of the present invention is to overcome the above-mentioned problems and to provide a fluid-sealed anti-vibration device comprising a first connecting member secured to a source of vibration, a second connecting member secured to a car body, a substantially cone-shaped elastic body member positioned therebetween, a fluid chamber which is formed by the first connecting member, the second connecting member and the elastic body member, and of which the wall is a part of the elastic body member, the fluid chamber being divided by a partition wall into a main fluid chamber and a sub-fluid chamber, and an orifice provided in the partition wall to communicate with the main fluid chamber and the sub-fluid chamber, characterized in that an elastic horizontally movable membrane is formed in a side wall member which encloses the main fluid chamber in a substantially cylindrical manner, and a control wall is provided in the main fluid chamber to face the horizontally movable membrane at intervals.

According to a second object of the present invention, the horizontally movable membrane is integrally formed with the elastic body member. At this time, the control wall can be provided integrally with or separately from the partition member. Also, a plurality of horizontally movable membrane can be provided to allow the eigen value of each horizontally movable membrane to be changed.

According to a third object of the present invention, a circular wall is formed inside the side wall member to face the side wall member at intervals, space provided between the circular wall and the side wall member opens to the main fluid chamber, and a part of the circular wall facing the horizontally movable membrane is the control wall.

According to a fourth object of the present invention, an elastic membrane is provided on the partition member and adapted to be elastically deformed as a result of the fluctuation of internal pressure in the main fluid chamber, the elastic membrane is formed as a non-circular member with a long side section and a short side section and provided in the central part thereof with a curved groove running substantially parallel to the long side section.

At this time, on a surface of the elastic membrane opposite to the curved groove, a stopper projection is integrally provided substantially parallel to the curved groove. The stopper projection can be formed only on the long side section. The periphery of the elastic membrane is integrally formed with a continuous, circular peripheral wall that is retained by the partition member, and a clearance can also be provided at the retaining section by the partition member so as to permit deformation of the peripheral wall.

Further, the partition member is provided with first to third passages of which the first passage is the damping passage for always communicating with the main fluid and sub-fluid chambers, the second passage can be freely opened and closed, and the third passage, of which part is covered by the elastic membrane which is elastically deformable to shut off the communication with the main fluid and sub-fluid chambers, and the elastic membrane is formed as the non-circular member.

According to the first invention, because a control wall is provided to face a horizontally movable membrane, pressure on the horizontally movable membrane generated as a result of vibration of an elastic body member is controlled by the control wall and the dynamic spring constant is lowered by membrane resonance. As a result, generation of a dynamic spring peak generated in medium frequency range can be controlled.

As shown in FIGS. 5 and 6, formation of the dynamic spring peak can be freely controlled by changing the size of the control wall. Also, as shown in FIGS. 7 and 8, the dynamic spring peak can be controlled by changing the clearance between the horizontally movable membrane and the control wall. Accordingly, the fluid-sealed anti-vibration device can be regulated by changing the setting of the control wall.

According to the second invention, a plurality of horizontally movable membranes is provided, wherein if the eigen value of each membrane is changed, the resonance of each horizontally movable membrane is generated in different eigen values and coupled resonance which is wide as a whole is generated. As a result, a low dynamic spring effect can be realized in a wider range. In the present invention, the eigen value is defined as individual resonance frequency, which varies with the size, thickness, materials (spring constant) and the like of the horizontally movable membrane.

According to the third invention, since a circular wall is formed to face the side wall member, it is easy to position the control wall and the horizontally movable membrane.

According to the fourth invention, when the internal pressure of the main fluid chamber increases, the elastic membrane is sheared to bend and deform at the curved groove which is located in the center thereof and runs substantially parallel to the long side section, and which serves as a flexural center. In this manner, even though the elastic membrane is formed as the non-circular member with the long and short side sections, it can easily bend in response to the increase in the internal pressure in the main fluid chamber. As a result, it is possible to absorb the increase in internal pressure of the main fluid chamber by utilizing the low dynamic spring effect.

If the stopper projection is projectingly formed on a surface opposite to the curved groove of the non-circular member, when large vibrations are input to the main fluid chamber, the stopper projection abuts the side of the partition member, whereby the spring constant of the elastic membrane changes nonlinearly and, as a result, the large input can be absorbed. Further, by providing the stopper projection only on the long side section to provide a discontinuous shape, the elastic membrane can be easily bent.

Since the clearance is provided at the section where the partition member retains the peripheral wall of the elastic membrane, it is possible to realize easier deformation of the elastic membrane. Further, the partition member is provided with first to third passages, of which the first orifice passage is the damping orifice passage for always communicating with the main fluid and sub-fluid chambers, the second passage can be freely opened and closed, and the third passage, of which part is covered by the elastic membrane to shut off the communication with the main fluid and sub-fluid chambers. Thus, by forming the elastic membrane as the non-circular member, it is possible to provide an efficient layout even in such a limited space as that of the partition member where the circular member can not be positioned.

BRIEF DESCRIPTION OF THE DRAWINGS

The above and other objects, and advantages of the present invention will become more apperent from the following description when taken in conjunction with the accompanying drawings.

DETAILED DESCRIPTION OF THE PREFERRED EMBODIMENTS

Figure 1:
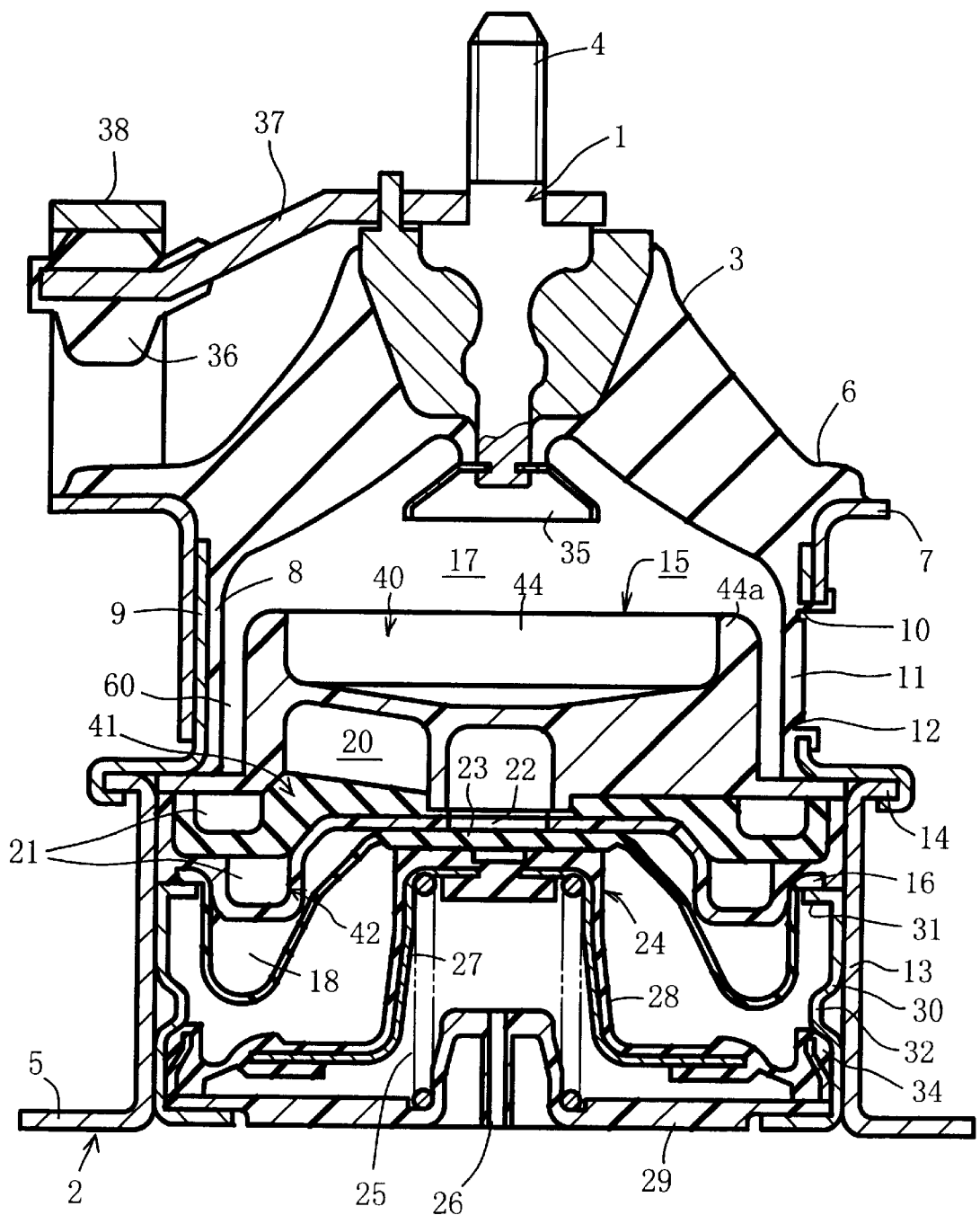
FIG. 1 is an entire cross-sectional view of a device according to a first embodiment (corresponding to a view taken along line 1—1 of FIG. 2)
Figure 2:
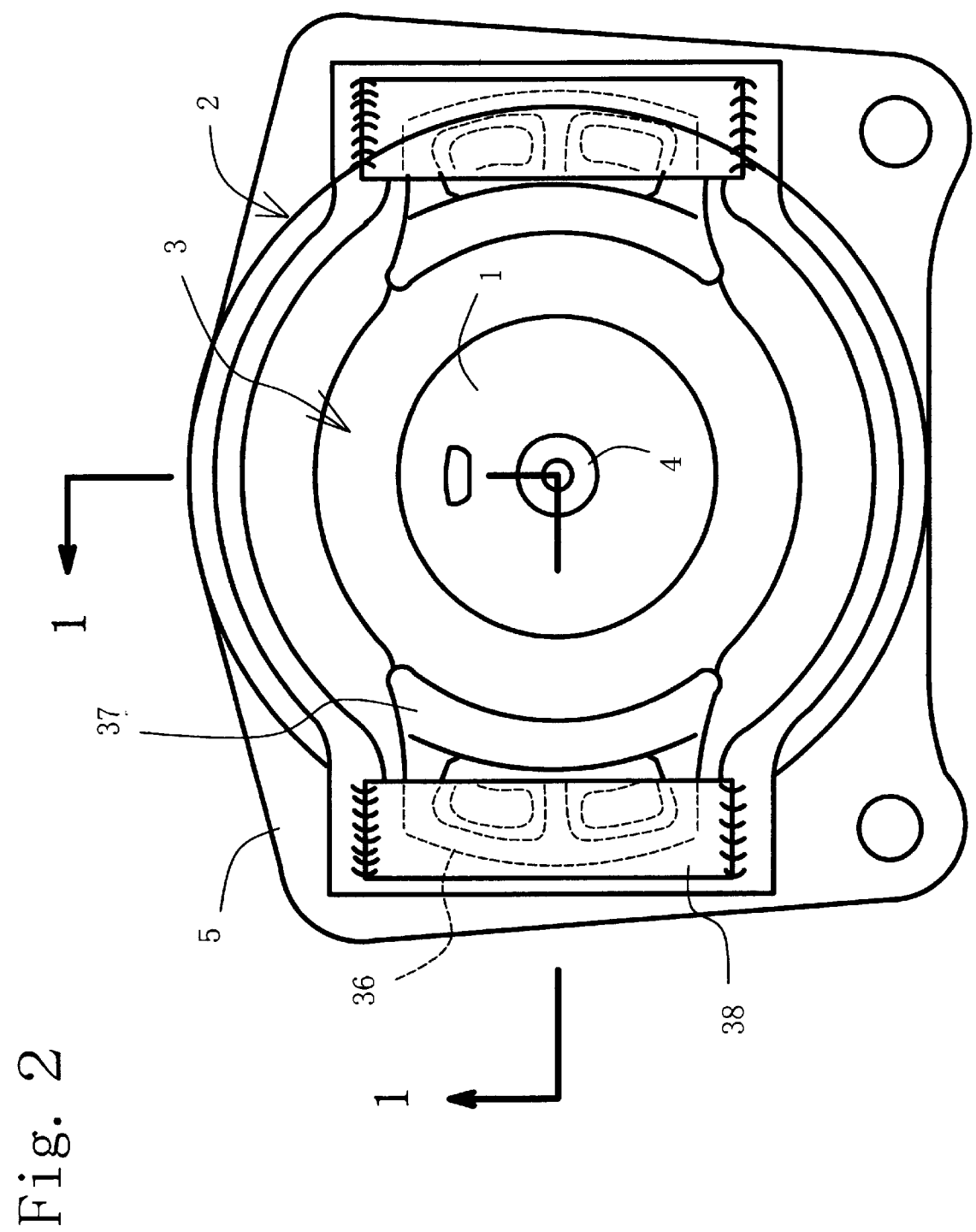
FIG. 2 is a plan view of the external appearance of the device.

Preferred embodiments of the present invention which are provided as an engine mount for an automobile will now be described with reference to the accompanying drawings.

Referring first to FIGS. 1 to 4, an engine mount as a fluid-sealed anti-vibration device has a first connecting member 1, a second connecting member 2 and an elastic body member 3. The first connecting member 1 is secured to an engine (not shown) by a screw member 4 and the second connecting member 2 is secured to the automobile body (not shown) by a flange 5.

The elastic body member 3 is a substantially cone-shaped member constructed of a suitable elastic material such as a known rubber, of which the top section is integrally penetrated by the first connecting member 1. A lower circumference of the elastic body member 3 is provided with a flange 6 which is integrally connected to a flange metal fitting 7 formed as a part of the second connecting member 2. A lower section of the elastic body member 3 extends further downward from the flange 6 to form an inner lining section 8 which extends cylindrically and is integrally secured to an inner surface of a side wall member 9.

The side wall member 9 forms a part of the second connecting member 2, the outside of which is integrally connected to the flange metal fitting 7 by welding. The circumference of the side wall member 9 is provided with round holes 10 at intervals of 180° in the circumferential direction. The inner lining section 8 is not supported by the side wall member 9 at the round hole 10 section and forms a horizontally movable membrane 11 which can undergo free elastic deformation. Round grooves 12 are formed at the circumferential locations of the horizontally movable membrane 11 corresponding to the inside of the round holes 10 so that the horizontally movable membrane 11 can be easily deformed. The lower section of the side wall member 9 is integrally secured to a flange 14 of a cylindrical base section 13 of the second connecting member 2 by caulking. The circumference of a partition member 15 and the circumference of a diaphragm 16 are secured to a junction of the side wall member 9 and the cylindrical base section 13.

The partition member 15 forms a main fluid chamber 17 together with the elastic body member 3 and forms a sub-fluid chamber 18 together with the diaphragm 16. The main fluid chamber 17 and the sub-fluid chamber 18 communicate through an idle orifice 20 for absorbing idling vibration formed in the partition member 15, and a damping orifice 21 for absorbing low frequency vibration. The idle orifice 20 is an opening and closing type of orifice which opens only at the time of idling, while the damping orifice 21 is always open.

Figure 3:
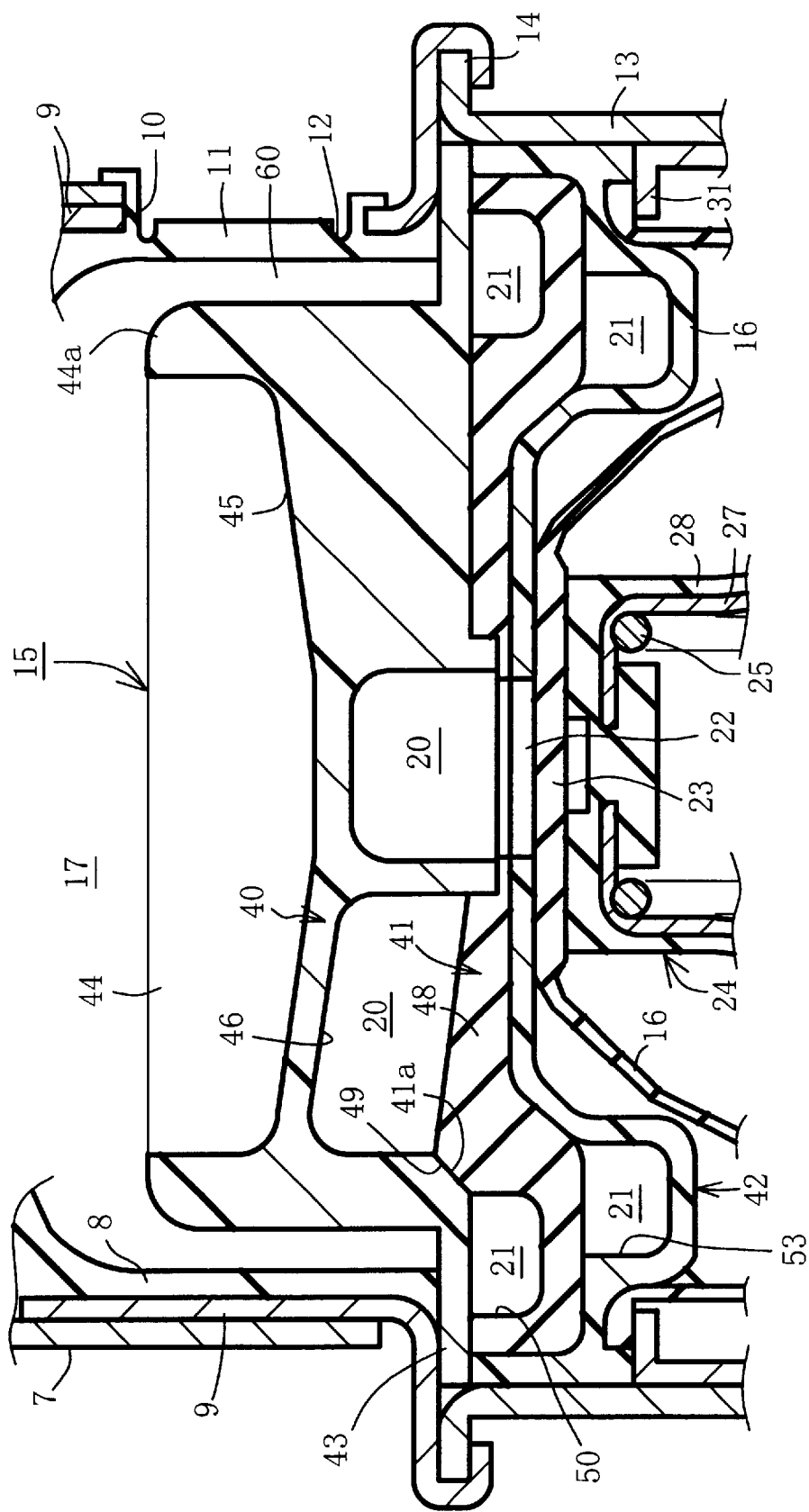
FIG. 3 is an enlarged cross-sectional view of basic parts of the device.
Figure 4:
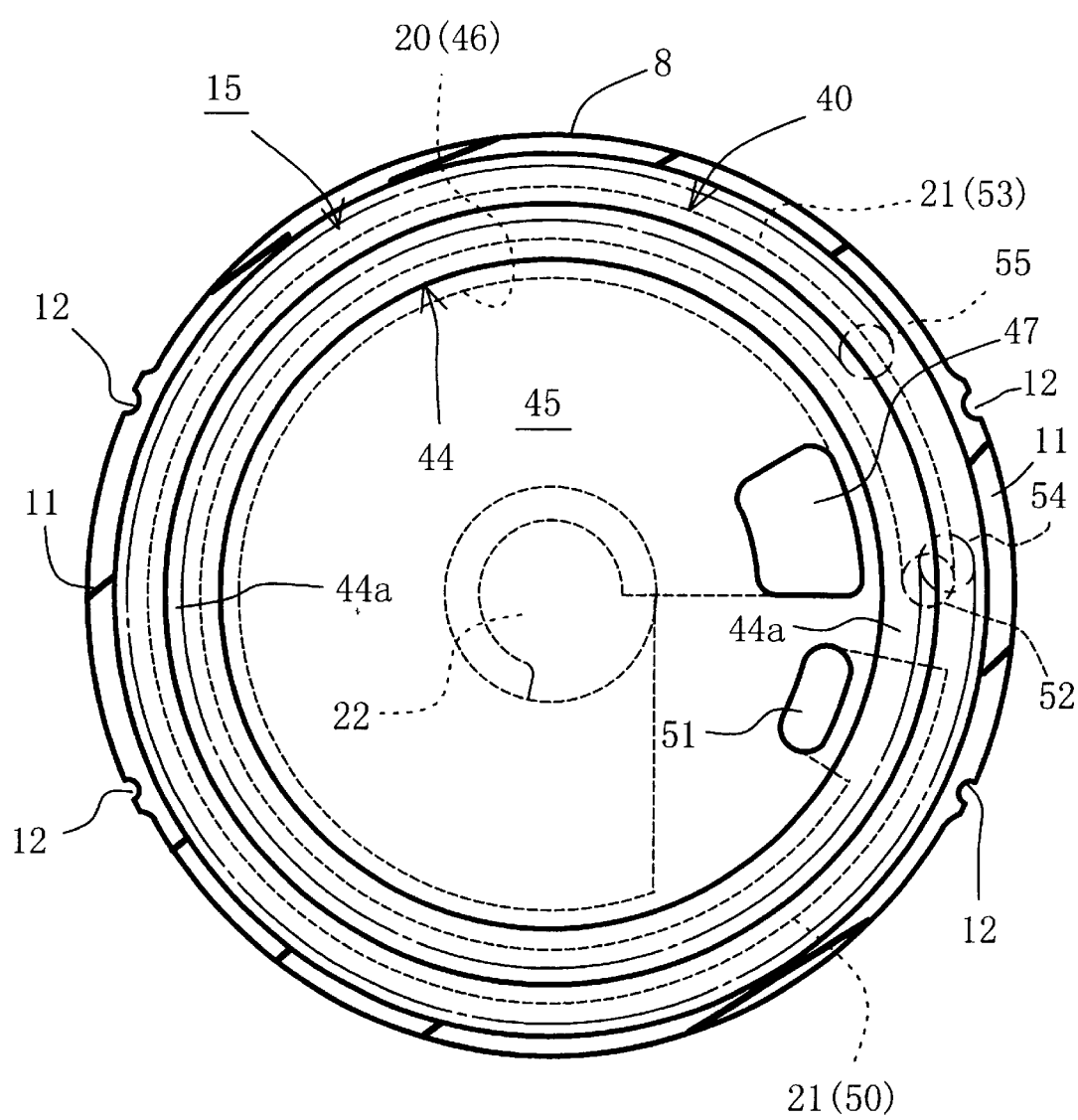
FIG. 4 is a plan view of a partition member section of the device.

As is obvious from FIGS. 3 and 4, an outlet 22 of the idle orifice 20 is closed when the top of a hollow valve 24 presses the central section 23 of the diaphragm 16 toward the outlet 22. On the other hand, the outlet 22 is opened when the inside of the valve 24 is forced from a communication passage 26 by a source of negative pressure (not shown) to provide a negative pressure and the valve 24 is lowered against a return spring 25 disposed therein, thereby allowing communication with the main fluid chamber 17 and the sub-fluid chamber 18.

The valve 24 is formed by covering the surface of a cup-shaped core bar member 27 with an elastic body 28. The lower periphery of the elastic body 28 closely adheres to a lid-shaped member 29 which engages a bottom section of the first connecting member 1, so that the inside is maintained in an air-tight condition. A supporting cylindrical metal fitting 30 engages the inside of the cylindrical base section 13. The upper end of the supporting cylindrical metal fitting 30 forms an inner flange 31 whereby the periphery of the diaphragm 16 is positioned between the flange 31 and the partition member 15. The middle section of the metal fitting 30 is provided with a step 32 projecting inward. The lower end of the metal fitting 30 is bent inward to form a caulking section 33 which overlaps the periphery of the lid-shaped member 29. A thickened end section 34 formed on the periphery of the elastic body 28 is positioned between the step 32 and the caulking section 33 whereby the end section 34 is caused to closely adhere to the lid-shaped member 29.

Reference numeral 35 in FIG. 1 is a medium and high frequency device, formed in a cup-shape which opens downward. The device 35 is secured to the lower end of the first connecting member 1 which projects into the main fluid chamber 17. The device 35 is adapted to move vertically together with the first connecting member 1 so as to generate fluid column resonance in the medium and high frequency range within the clearance formed between the medium and high frequency device 35 and the elastic body member 3.

Reference numeral 36 is a stopper formed at the end of a stopper arm 37 which extends in the radial direction from the first connecting member 1. The stopper 36 enters a stopper bracket 38 formed in an arch shape upward from the flange metal fitting 7 and contacts the flange 6 at the time of large vibration to control deformation of more than a fixed level.

Construction of the partition member 15 will now be described. As shown in FIGS. 3 and 4, the partition member 15 is arranged to overlap three members, an upper member 40, an intermediate member 41, and an lower member 42 vertically, with the intermediate member 41 situated between the upper and lower members. The upper member 40 is constructed of a comparatively rigid plastic material. A flange 43 is formed on the circumference thereof and a circular wall 44 is formed inside the flange 43 projecting upward. Both the flange 43 and the circular wall 44 are integrally formed with the upper member 40. The circular wall 44 faces the side wall member 9 with a predetermined clearance therebetween and in particular, a part of the circular wall 44 facing the horizontally movable membrane 11 forms a control wall 44a of the present invention.

The circular wall 44 is provided with a recess 45 in the inside thereof, of which the lower surface is formed with an idle orifice groove 46 in a vortex manner. One end of the idle orifice groove 46 forms an inlet 47 which opens into the recess 45, while the other end is guided to the center direction of the recess 45 and opens downward to communicate with the outlet 22 which is formed substantially in the center of the lower member 42. The idle orifice groove 46 overlaps the intermediate member 41 located thereunder which closes the open section thereof, thereby forming the idle orifice 20.

The intermediate member 41 is constructed of a comparatively soft elastic material such as rubber and has a groove 50 which opens upward at a position outside the idle orifice 20. The open end of the groove 50 is closed by the flange 43 to form a part of the damping orifice 21. The groove 50 communicates with the main fluid chamber 17 through an inlet 51 which is formed in one end of the flange 43 and communicates with the damping orifice 21 on the side of the lower member 42 at a communicating opening 52 which is formed in other end of the flange 43.

A border section between an outer peripheral side of an inner periphery section 48 and the groove 50 is provided with a slope 49. The intermediate member 41 is also provided with a slope 41a at a border section between the idle orifice groove 50 and the flange 43. The faces of the two slopes 49 and 41a are arranged to slide with respect to one another.

The lower member 42 is also constructed of comparatively rigid material such as resin in the same manner as the upper member 40. A groove 53 which opens upward is formed in the outer periphery of the lower member 42 and is closed by the bottom section of the intermediate member 41 to form a part of the damping orifice 21. The positions of the two grooves 53, 50 partially overlap, wherein one end of the groove 53 communicates with the communicating opening 52, while the other end forms an outlet 55 which opens into the sub-fluid chamber 18.

Figure 6:
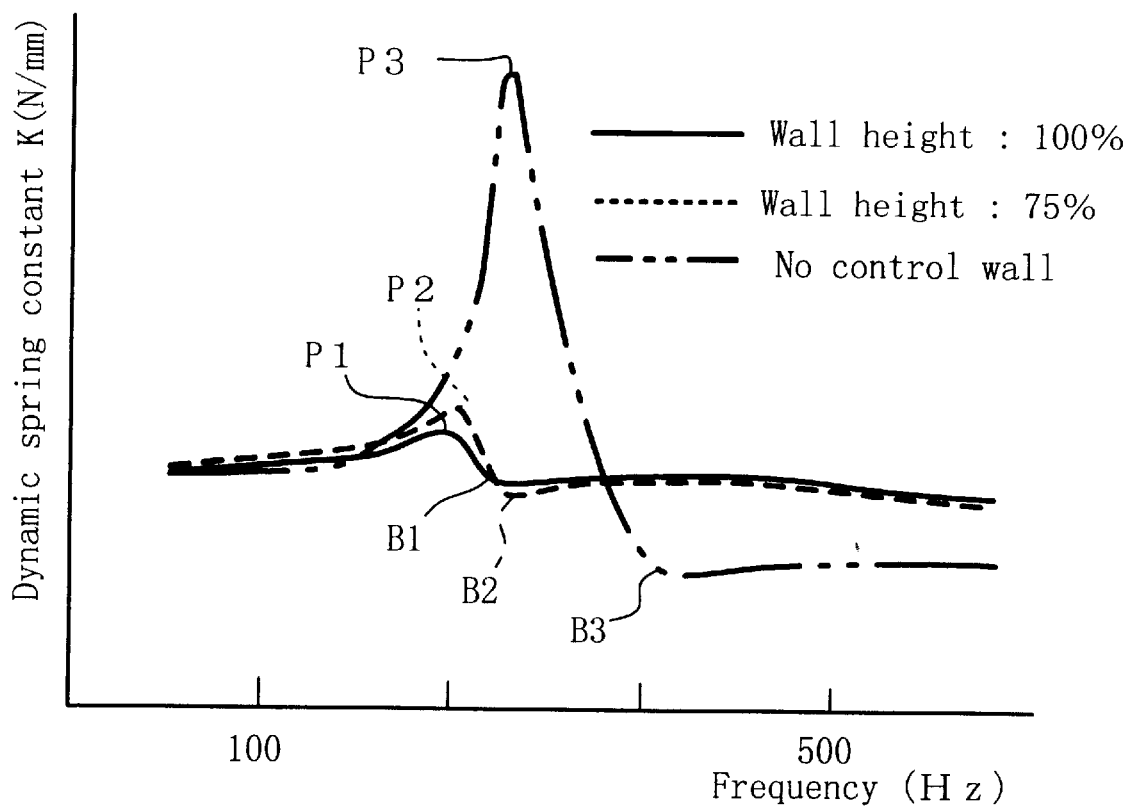
FIG. 6 is a graph showing the change in dynamic spring constant caused by the control wall.

An operation of the present embodiment will now be described. As shown in FIG. 6, a device with the circular wall 44 is compared with a device without the wall 44 (see a dashed line). In the device with the circular wall 44, the dynamic spring peak can be remarkably controlled compared with the device without the wall 44. The dynamic spring peak P3 in the case where the circular wall 44 is not provided is much higher than the peaks P1, P2 in the case where different sizes of circular walls 44 are provided.

When the circular wall 44 is not provided, the total energy of the fluctuations in internal pressure due to the deformation of the elastic body member 3 is added to the horizontally movable membrane 11 and as a result, the resonance energy of the horizontally movable membrane 11 becomes large. Thus, the low dynamic spring effect generates a remarkable dynamic spring bottom B3 and as a reaction to this dynamic spring bottom B3, the dynamic spring peak P3 with a high dynamic spring constant is generated. On the other hand, by providing the circular wall 44, the dynamic spring bottoms B1, B2 in the case where the membrane resonance energy is limited rise higher and as a reaction to this, the dynamic spring peaks P1, P2 become low. Thus, the vertical variation width of the dynamic spring constant becomes small inversely and as a result, equalized low dynamic spring characteristics with a smooth curved line as a whole can be realized.

Figure 5:
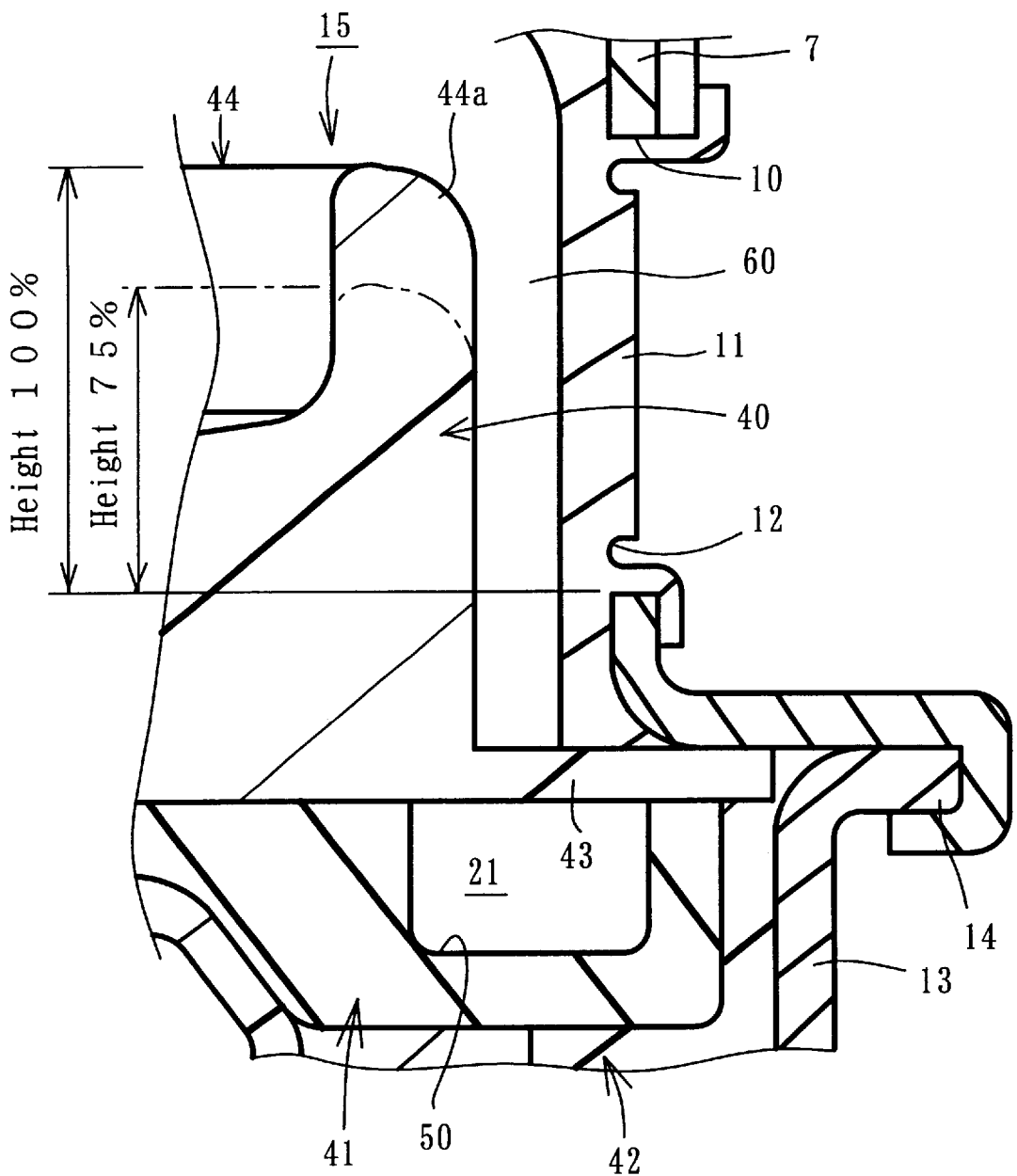
FIG. 5 is a partial cross-sectional view showing the change in height of a control wall of the device.

As a control means for the amount of energy to generate such a membrane resonance, it is possible to change the size of the circular wall 44 covering the horizontally movable membrane 11 and to change the distance between the circular wall 44 and the horizontally movable membrane 11. As shown in FIG. 5, the height of the circular wall 44 (i.e. the height which correlates with the size for covering he horizontally movable membrane 11) can be optionally set, for example, to the same height as the horizontally movable membrane 11, i.e. a height of 100% covered (see the solid line) and to a height slightly lower than that of the horizontally movable membrane 11, i.e. a height of 75% covered (see the broken lie).

The change of the dynamic spring constant according to this setting is shown in FIG. 6. When the height of the circular wall 44 is set to 100%, the dynamic spring peak is P1 and the dynamic spring bottom is B1. When the height of the circular wall 44 is set to 75%, the dynamic spring peak is B2 and the dynamic spring bottom is B2. The relationship for the dynamic spring bottom is B1>B2 and for the dynamic spring peak is P1<P2. Accordingly, it is to be noted that the higher the circular wall 44 (namely, the larger the covered percentage), the smaller the gap between the dynamic spring peak and the dynamic spring bottom.

This means that when the internal pressure exerted on the horizontally movable membrane 11 as a result of deformation of the elastic body member 3 is controlled, the energy related to the resonance of the horizontally movable membrane 11 is reduced, and thus the more the horizontally movable membrane 11 is covered, the more the height of the dynamic spring peak is controlled and the energy of the membrane resonance is reduced. By reducing and equalizing the vertical variation width of the dynamic spring constant, it is possible to realize low dynamic spring characteristics with a smooth curved line as a whole. Accordingly, by changing the height of the circular wall 44, it is possible to optionally adjust the dynamic spring peak.

Figure 7:
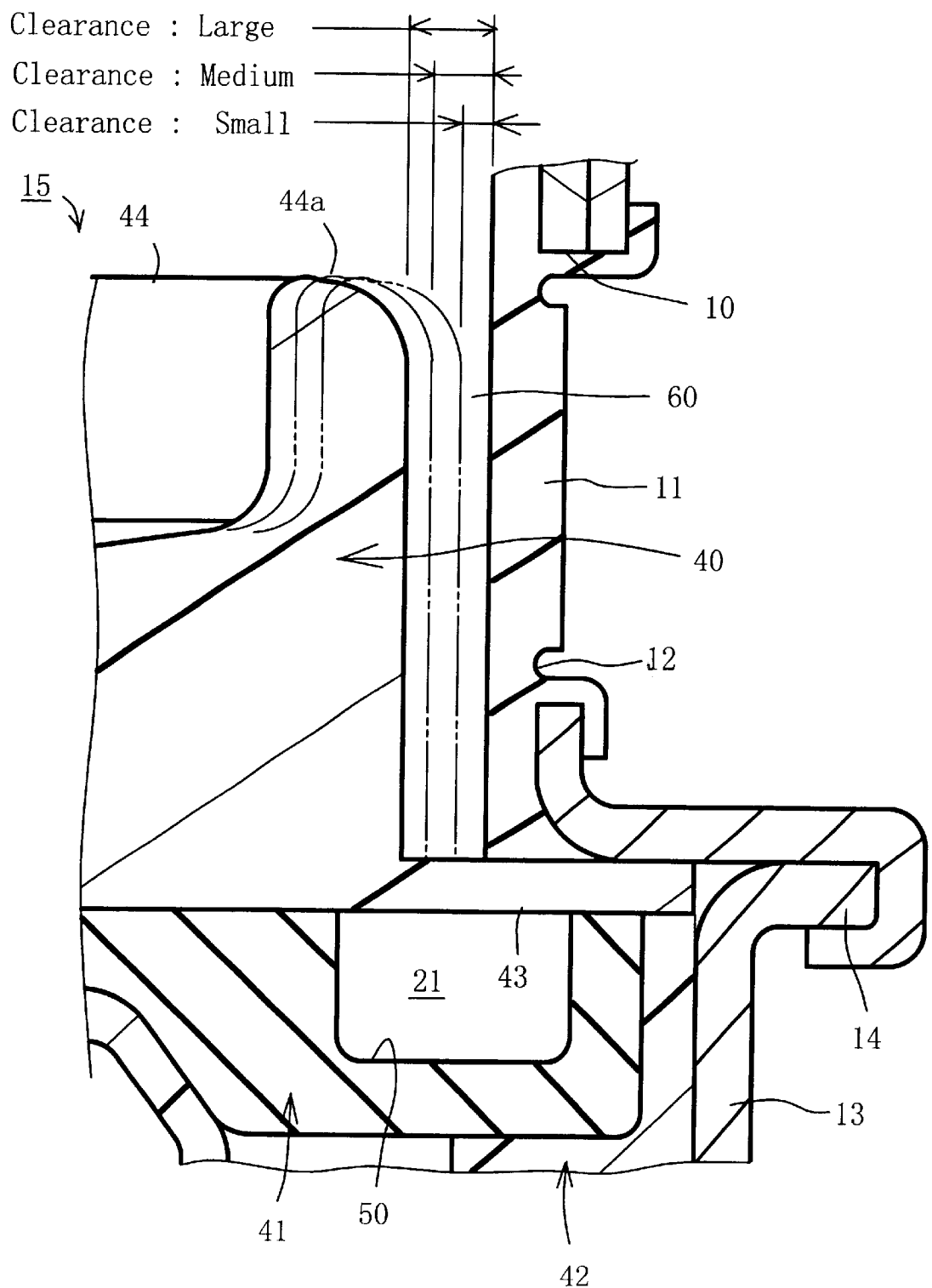
FIG. 7 is a partial cross-section view showing the change in clearance of the control wall.
Figure 8:
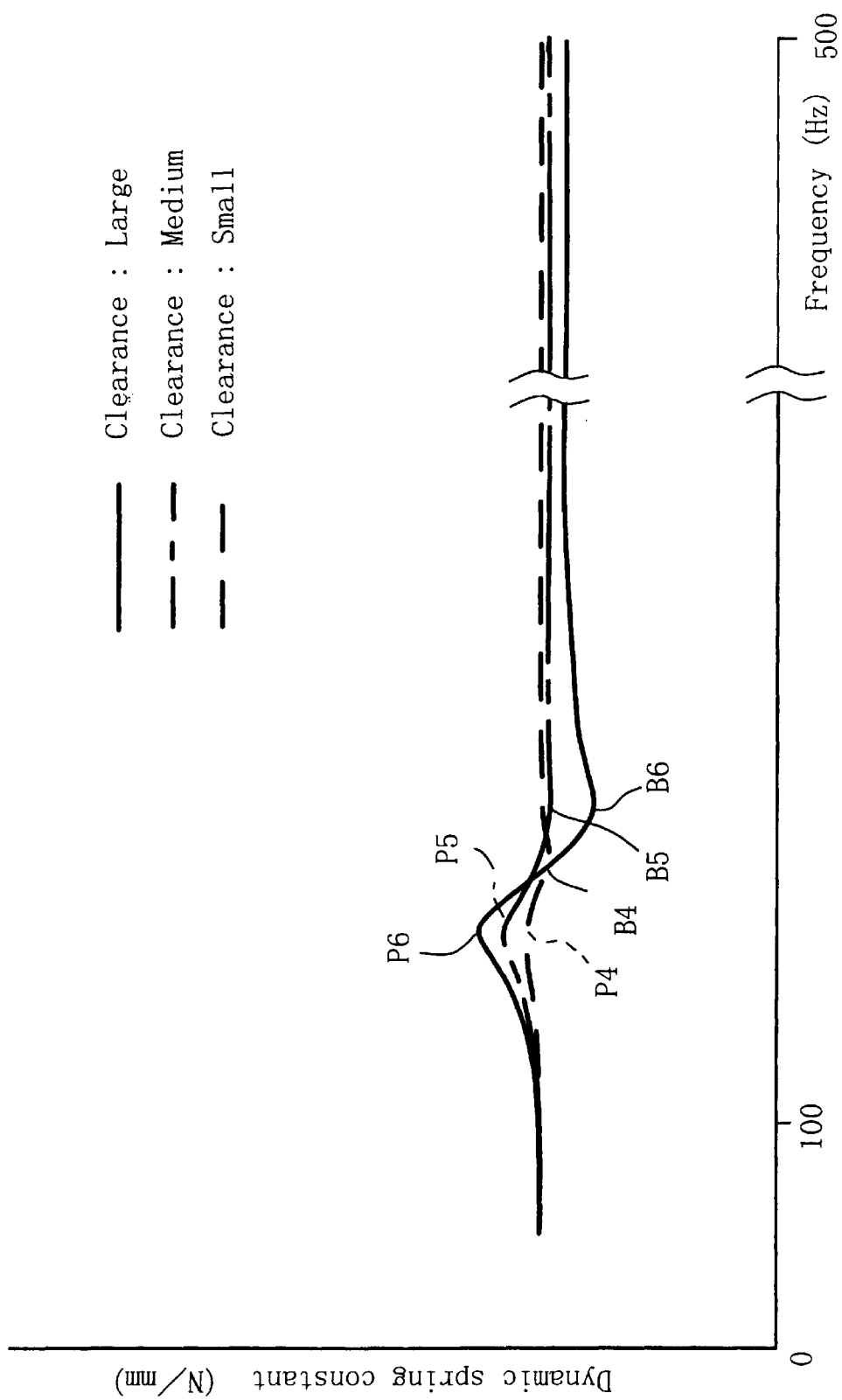
FIG. 8 is a graph showing the change in dynamic spring effect caused by the clearance change.

On the other hand, as shown in FIG. 7, adjustment can be made by changing the distance, i.e. the clearance between the circular wall 44 and the horizontally movable membrane 11, with the height of the circular wall 44 fixed. Namely, when the clearance is changed to Large (solid line), Medium (dashed and dotted line), and Small (dashed line), the dynamic spring constant changes, as shown in FIG. 8, to P4<P5<P6 and B4>B5>B6 in sequence when each dynamic spring peak is P4, P5 and P6 from the clearance Small, and the dynamic spring bottom is B4, B5, and B6 in the same manner as above. Accordingly, it is to be understood that the depression effect of the dynamic spring peak and the equalization effect of the dynamic spring constant change in order of clearance, i.e. Large<Medium<Small.

This means that the smaller the clearance, the more the amount of energy related to deformation of the horizontally movable membrane 11 out of the energy of the fluctuation in the internal pressure as a result of the elastic deformation of the elastic body member 3 is limited. Accordingly, it is clear that the dynamic spring peak can also be regulated by adjusting the clearance. If the clearance is combined with each change of height, it is further possible to make more accurate adjustment in wider frequency ranges.

Figure 9:
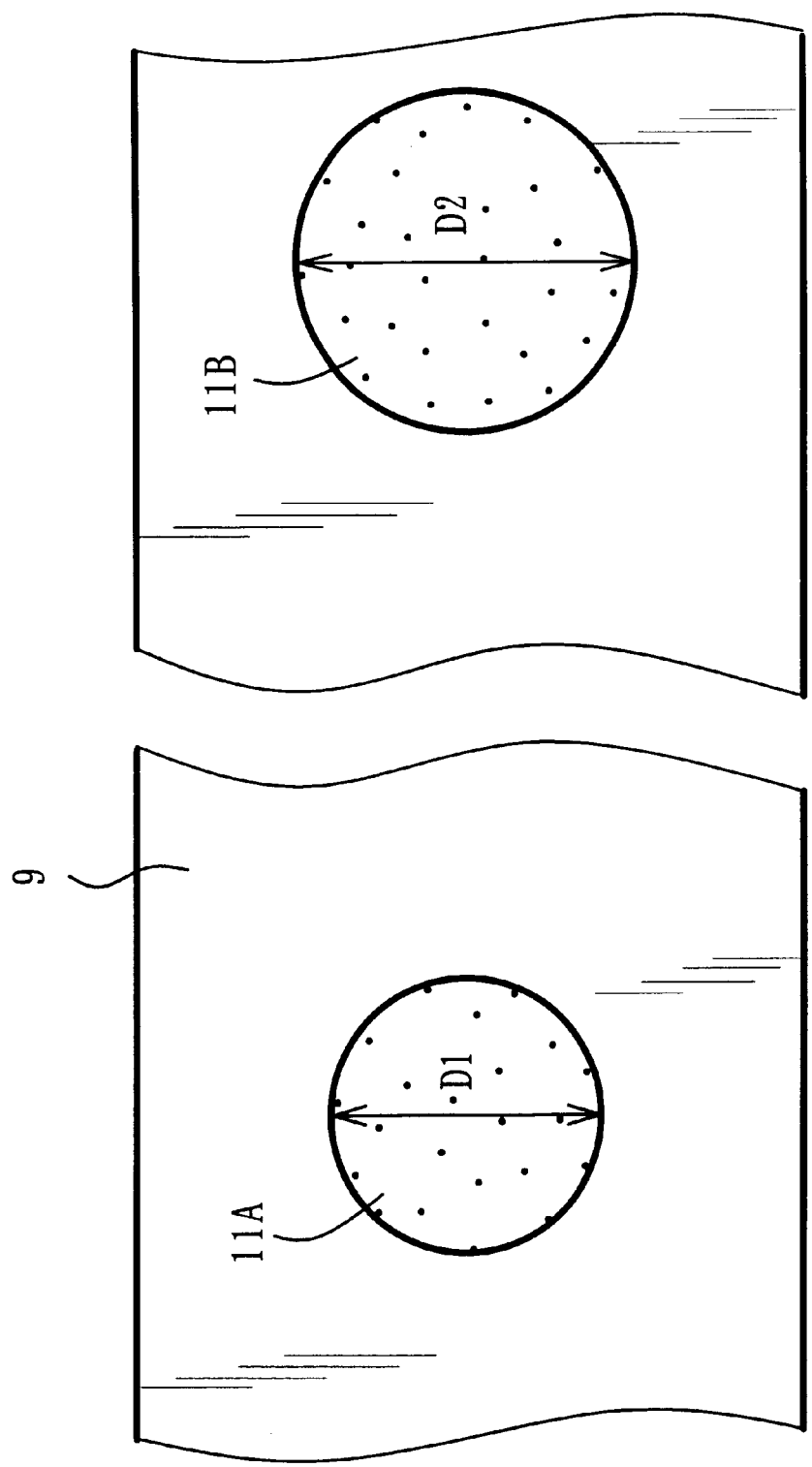
FIG. 9 is a development elevation depicting two movable membranes shown side by side according to a fourth embodiment.

FIG. 9 relates to a fourth embodiment and is a development elevation depicting two horizontally movable membranes 11 facing at intervals of 180°, shown side by side. In this embodiment, when the diameter of one of the horizontally movable membranes 11A is D1 and the diameter of the other 11B is D2, the relationship between the two horizontally movable membranes is changed to: D1<D2.

Figure 10:
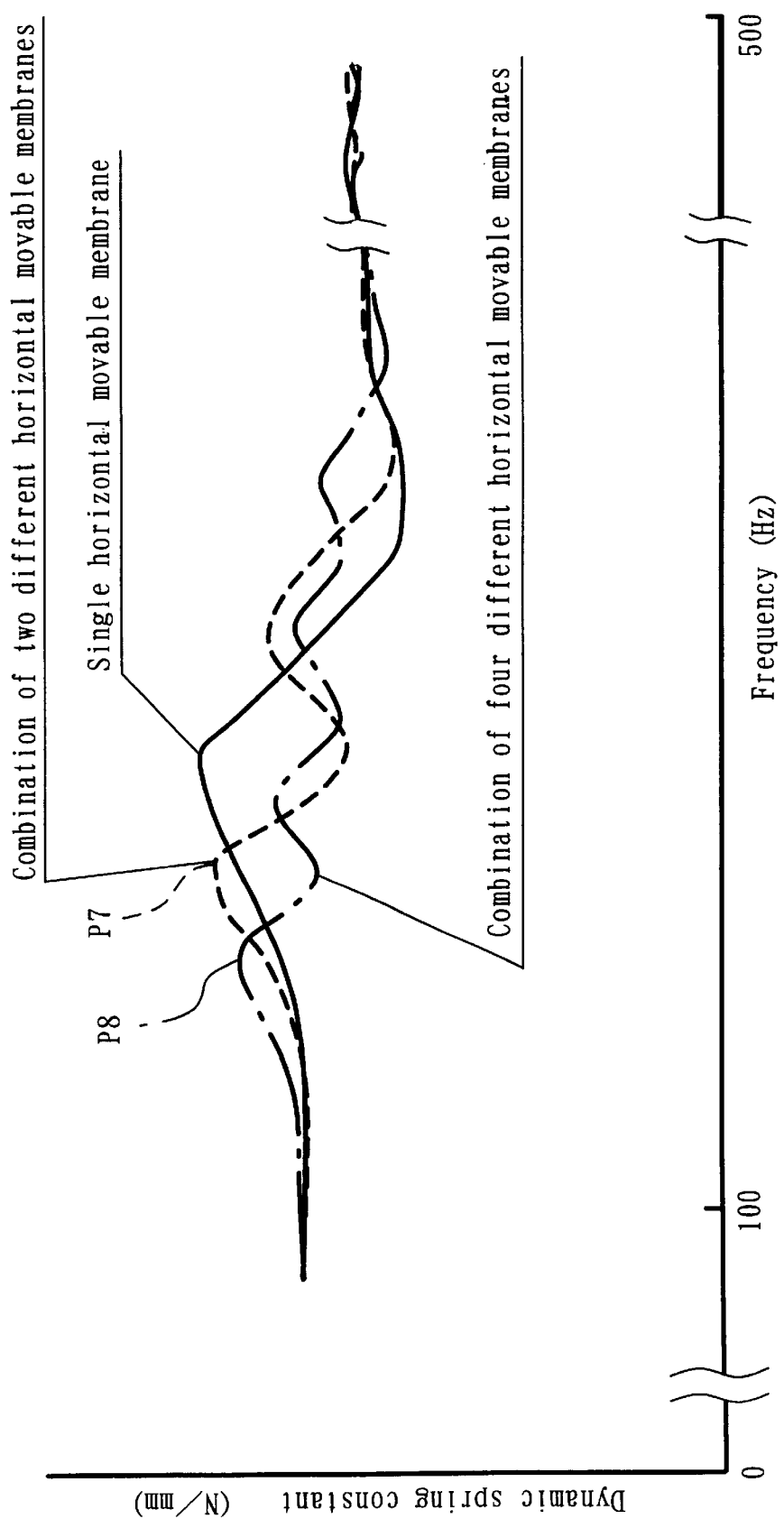
FIG. 10 is a graph showing the effect of the fourth embodiment.

With this arrangement, because there is a difference in the eigen values of the horizontally movable membranes 11A and 11B, it is possible to generate membrane resonance in a different frequency and, as a result, a coupled resonance is generated. FIG. 10 is a graph showing the coupled resonance, in which a combination of two different kinds of horizontally movable membranes (large size and small size) indicated by a dashed line clearly shows a smaller dynamic spring peak P7 (highest one is shown) than a single use of the horizontally movable membrane (i.e. same as the first embodiment) shown by a solid line.

A case where four horizontally movable membranes are provided at intervals of 90° and their sizes are changed to two, each, large and small, is shown by a long and short dashed line. The dynamic spring peak P8 (highest one is shown) of the coupled resonance is much lower and formed on the high frequency side.

Thus, if the horizontally movable membranes are combined by changing the eigen value, it is possible to realize a lower dynamic spring effect as a result of the coupled resonance and also to realize a low dynamic spring effect in the wider frequency ranges. Further, adjustment with a high degree of freedom is possible.

It is to be noted that the present invention is not limited to the embodiments described above, but may be varied in many ways. For example, the circular wall 44 is not provided, but an independent control wall 44a may be provided only at a section where it corresponds to the horizontally movable membrane 11. In this manner, it is also possible to fully control the resonance of the horizontally movable membrane 11. The control wall 44a or the circular wall 44 may be provided separately from the partition member 15.

Figure 11:
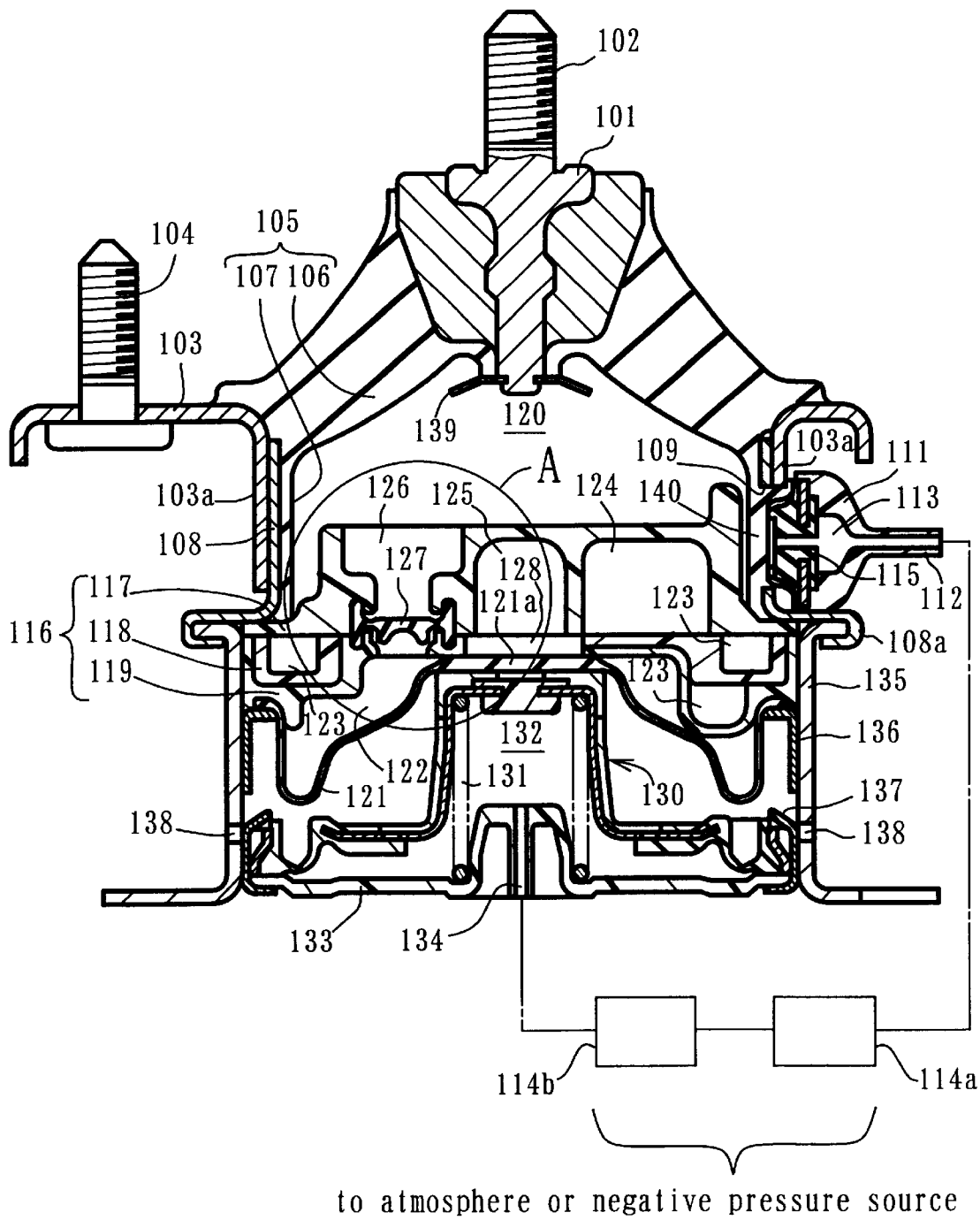
FIG. 11 is an entire cross-sectional view of an engine mount according to an embodiment.
Figure 12:
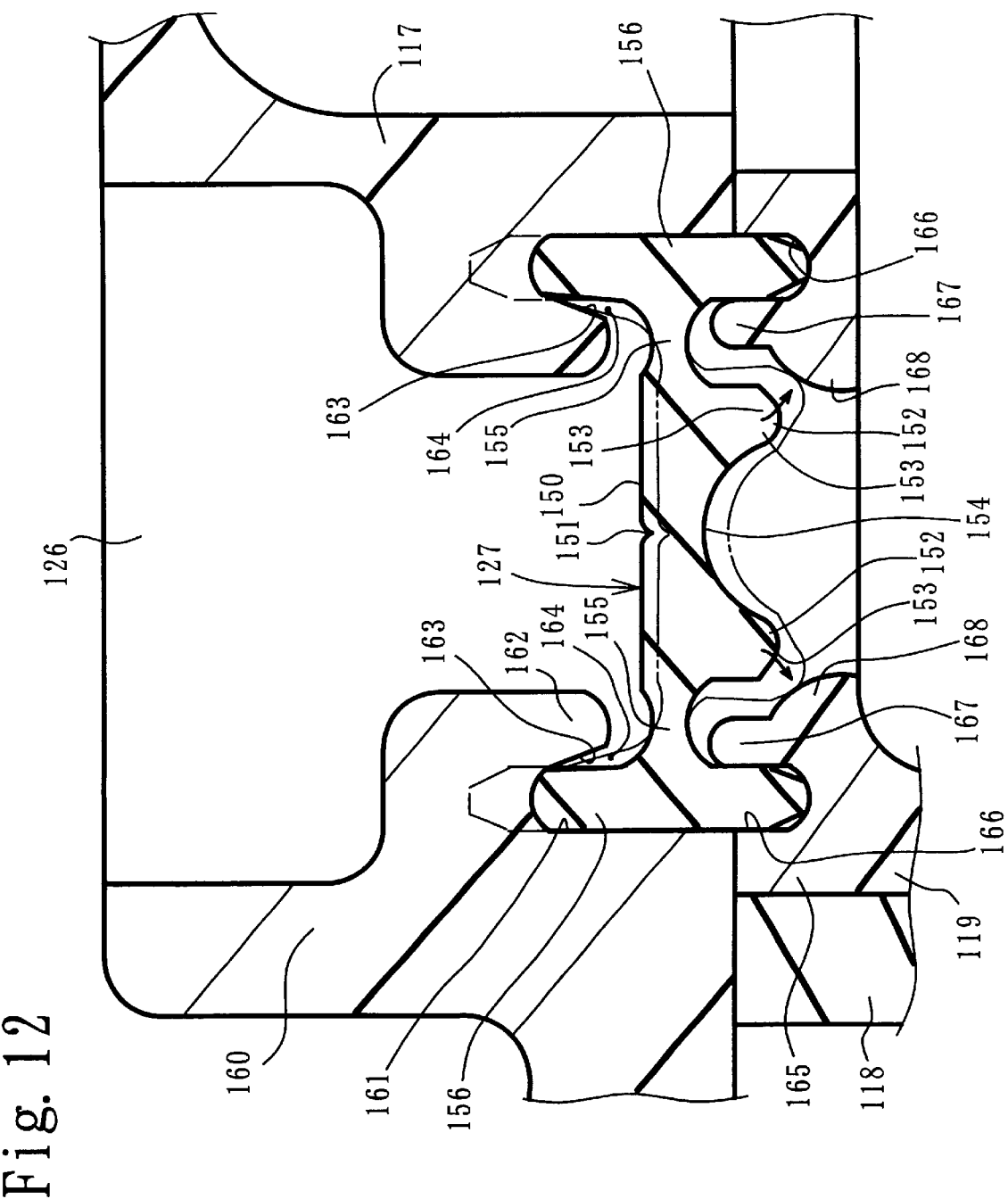
FIG. 12 is an enlarged view of Section A of FIG. 11.
Figure 13:
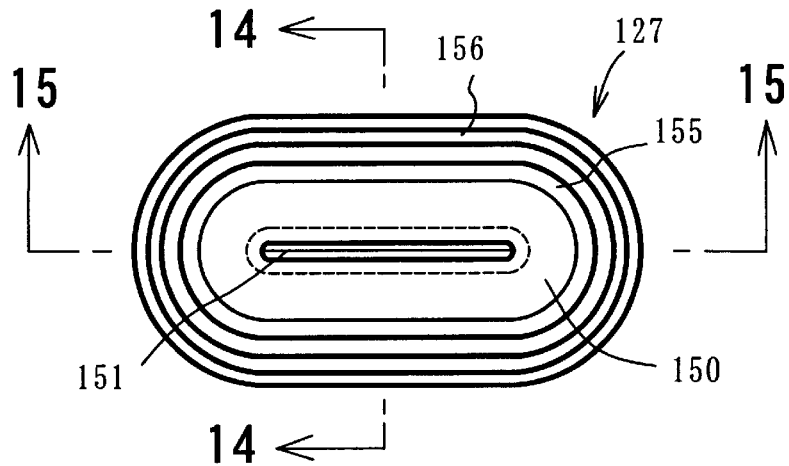
FIG. 13 is a plan view of an elastic membrane according to the embodiment viewed from a side of a main fluid chamber.
Figure 14:
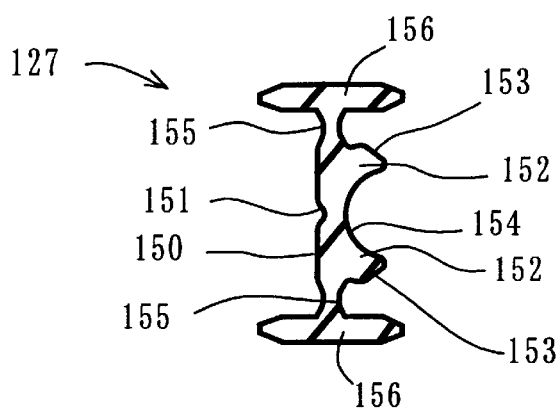
FIG. 14 is a cross-sectional view of the elastic membrane taken along line 14—14 of FIG. 13.
Figure 15:
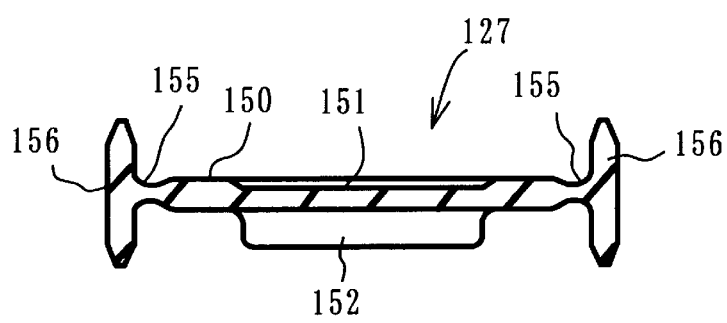
FIG. 15 is a cross-sectional view of the elastic membrane taken along line 15—15 of FIG. 13.
Figure 16:
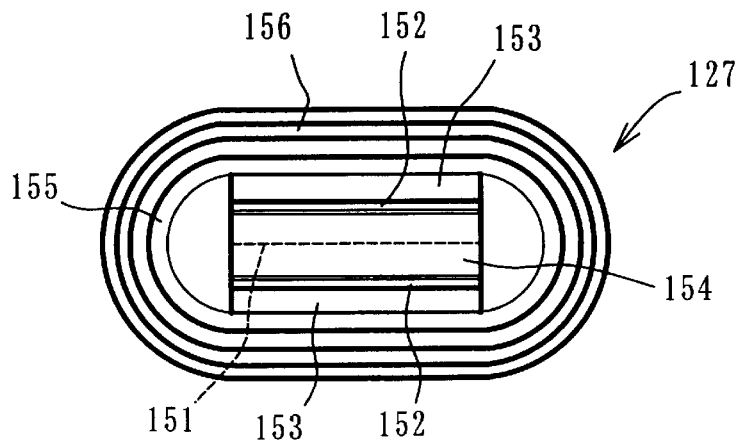
FIG. 16 is a bottom view of the elastic membrane.

A third embodiment of the present invention which is provided with an elastic membrane in the partition member. FIG. 11 is an entire cross-sectional view of the engine mount and FIG. 12 is an enlarged view of Section A of FIG. 11. First, in FIG. 11, reference numeral 101 is a first connecting member which is secured to an engine side by a bolt element 102 and reference numeral 103 is a second connecting member secured to a body side by a bolt 104. 105 is an elastic body member constructed of a suitable elastic material such as rubber, which has a substantially cone-shaped dome element 106 and a cylindrical element 107 following the dome element 106.

The cylindrical element 107 integrally adheres to an inner peripheral side of a substantially cylindrical rigid body wall 108 of which the outer peripheral side integrally overlaps a cylindrical element 103a formed as a part of the second connecting member 103. A part of the cylindrical element 103a and the rigid body wall 108 is formed with a circular hole 109 which is covered by a part of the cylindrical element 107. The part of the cylindrical element 107 serves as a movable membrane 110 which is elastically deformable.

The movable membrane 110 is covered by a holder 111 with a substantially funnel-shaped section from the outside of the cylindrical element 103a. A pipe element 112 projecting outward from the central part of the holder 111 is connected to a switching valve 114a. Switching an atmospheric release or connection to a negative pressure source such as depression at engine manifold can be performed by this switching valve 14a.

The inside of the holder 111 forms a control chamber 113 which is changed to an atmospheric release condition or to a negative pressure condition by operation of the switching valve 114a. A movable membrane stopper 115 composed of an elastic member such as rubber is provided between the holder 111 and the movable membrane 110 to control the elastic deformation of the movable membrane 110 at a predetermined level.

An opening section of the cylindrical element 107 is covered by a partition member 116. Formed between the partition member 116 and the elastic body member 105 is a main fluid chamber 120 of which the wall is part of the elastic body member 105. A sub-fluid chamber 122 is formed on the side of the partition member 116 opposite to the main fluid chamber 120 and is covered by a diaphragm 121. An incompressible fluid is filled into and sealed in the main fluid chamber 120 and the sub-fluid chamber 122. The partition member 116 is formed by overlapping three members, an upper partition 117, an intermediate partition 118, and a lower partition 119 of which each member is composed of a suitable rigid material such as synthetic resin.

In the upper partition 117, as similarly as above mentioned embodiments, a circular wall 140 is integrally formed projecting upward. The circular wall 140 faces the side wall member 108 with a predetermined clearance therebetween and in particular, a part of the circular wall 140 facing the horizontally movable membrane 110 forms a control wall 141. Between the control wall 141 and the horizontally movable membrane 110, a gap with a predetermined size is formed. Whereby the dynamic spring peak effect as similar as each above mentioned embodiment can be attained.

Formed between the upper partition 117 and the intermediate partition 118, and between the intermediate partition 118 and the lower partition 119 is a helical damping orifice passage 123, of which one end communicates with a common passage 124 formed between the upper partition 117 and the intermediate partition 118 and the other end communicates with the sub-fluid chamber 122 through an opening section (not shown in the figure) formed at a part of the lower partition 119.

The common passage 124 then communicates with an idle orifice passage 125 which is a second passage formed in the upper partition 117, and with an orifice hall 126 serving as a third orifice passage in sequence. The orifice hall 126 opens to the main fluid chamber 120. Therefore, the common passage 124 always communicates with the main fluid chamber 120 and the sub-fluid chamber 122 to generate a damping force relative to vibration with a comparatively low frequency and large amplitude such as suspension vibration, thereby absorbing the vibration.

The bottom section of the orifice hall 126 is covered by an elastic membrane 127 composed of an elastic material such as rubber whereby the communication of the orifice hall 126 with the sub-fluid chamber 122 is shut off. With the vibration of this elastic membrane 127, the fluid in the orifice hall 126 generates fluid column resonance in a comparatively higher frequency range such as when a vehicle starts.

An opening section (not shown) of the idle orifice passage 125 opens to the orifice hall 126 which communicates with the damping orifice passage 123 through the common passage 124 as described above. Although these opening areas are not shown in the figure, the resonance frequency of each fluid column resonance is tuned in order of the relation: the orifice hall 126>the idle orifice passage 125>the damping orifice passage 123.

The outlet 128 of the idle orifice passage 125 on the side of the sub-fluid chamber 122 is opened or closed by a thick section 121a which is formed at the central part of the diaphragm 121. When the outlet 128 is opened, the idle orifice passage 125 communicates with the main fluid chamber 120 and the sub-fluid chamber 122 to fluid-resonate and absorb the vibrations during idling on a higher frequency side than the damping orifice passage 123.

Opening and closing operations of the thick section 121a are performed by a separate opening and closing member 130. The opening and closing member 130 is so arranged that the thick section 121a is biased toward the periphery of the outlet 128 by a return spring 131 and forms a closed actuating chamber 132 between itself and a bottom member 133 to communicate with a pipe element 134 which is formed on the central part of the bottom member 133. The pipe element 134 is connected to the switching valve 114b to switch the atmospheric release condition or the negative pressure condition. When the insides of the actuating chamber 132 and the control chamber 113 are synchronized for switching, the switching valves 114a and 114b can be made common.

When the inside of the actuating chamber 132 is kept under a negative pressure, the opening and closing member 130 is lowered downward in the figure against the return spring 131 to remove the thick section 121a from the periphery of the outlet 128, whereby the outlet 128 is opened so that the idle orifice passage 125 communicates with the main fluid chamber 125 and the sub-fluid chamber 122.

By clamping a clamping flange 108a formed on the lower section of the rigid body wall 108 in the figure and an upper section of a lower cylindrical member 135, the partition member 116 is fixedly secured between the clamping flange 108a and a fixing flange member 136 integrally attached to the inner peripheral side of the lower cylindrical member 135. Further, each outer peripheral section of the opening and closing member 130 and the bottom member 133 is overlapped and secured by clamping the upper and lower ends of a ring member 137 which is integrally situated on the inner periphery of the lower section of the lower cylindrical member 135 in the figure. Reference numeral 138 is an air hole formed on the lower cylindrical member 35 so that it overlaps partially the ring member 137.

Each of the second connecting member 103, the rigid body wall 108, the lower cylindrical member 135, the fixing flange member 136, and the ring member 137 is composed of a suitable material with stiffness properties such as a metal. Reference numeral 139 in the figure is a substantially plate-shaped intermediate and high frequency device that is adapted to generate fluid column resonance between itself and the dome element 106 in intermediate and high frequency ranges.

As shown in FIG. 12, the elastic membrane 127 of which the body section 150 crosses the intermediate section of the orifice hall 126 is provided on the central section thereof with a curved groove 151 on the main fluid chamber 120 side.

A pair of stopper projections 152, 152 is projectingly provided on a surface of the sub-fluid chamber 122 opposite to the curved groove 151 to position the central section of the elastic membrane therebetween. The outside ends of the stopper projections are provided with abutting slopes 153, 153, respectively. A curved recess 154 is formed between the stopper projections 152, 152. The periphery of the body section 150 is formed with a thin section 155 and a vertical wall-shaped peripheral wall 156 is provided at the edge section outside the thin section 155 to enclose the body section 150 circularly.

As shown in these FIGS. 13 to 16, the elastic membrane 127 is formed in an oval shape with a linear long side section 157 and an arc-shaped short side section 158 and a curved groove 151 is formed parallel to and within the range of the long side section 157. In the present invention, the short side section 158 is a radius section connecting the end sections of the long side sections 157, 157, while the short side is a section enclosed by a straight line connecting the end sections of the long side sections 157, 157 and the short side section 158.

The stopper projection 152 is also paired to position the curved groove 151 therebetween and is formed parallel to the curved groove 151 and the long side section 57. Both ends of each stopper projection 152 in the longitudinal direction are formed as free ends, and no stopper projection is formed connecting these opposing free ends in the short side section 158.

The thin section 155 and the peripheral wall 156 are circularly formed in succession on the front and back of an elastic membrane 127 and the peripheral wall 156 is formed to project long on two sides. The projecting length of the peripheral wall 156 in the present embodiment is longer than that of the stopper projection 152.

As shown best in FIG. 12, the upper side of this peripheral wall 156 engages a circular groove 161 formed on forked sections 60 of the upper partition 117. An inner peripheral section 162 of the forked section 160 is provided with a step to narrow the passage cross-section at the intermediate section of the orifice hall 126 and a surface facing the circular groove 161 is formed with a slope 163 and the end of the inner peripheral section 162 is close to the thin section 155. The slope 163 serves to allow the peripheral wall 156 which originally stands upright as shown in a virtical line, to bend outward. The end of the slope 163 provides a clearance 164 between itself and the peripheral wall 156 to permit elastic deformation of the peripheral wall 156 when bent inwardly.

On the other hand, the lower side of the peripheral wall 156 in FIG. 12 engages the circular groove 166 formed on a forked section 165 of the lower partition 119. The inner peripheral section 167 of the forked section 165 is provided with a narrow section in the area where a part of the end of the inner peripheral section 167 is close to the thin section 155 of the elastic membrane 127 so that a predetermined clearance is formed between the inner peripheral section 167 and the stopper projection 152. The intermediate section of the inner peripheral section 167 is formed in a slant and a step 168 on a slant to face the abutting slope 153 of the elastic membrane 127 and the lower section thereof is provided with a widened section.

In this manner, when the elastic membrane 127 undergoes elastic deformation, the right and left stoppers 152, 152 open outward. When the elastic membrane 127 is deformed as shown in the virtual line of the figure, the abutting slope 153 first abuts the step 168 to deform the end section of the stopper projection 152. When the end section is deformed further, the entire stopper projection 152 is pushed to the narrow section on the top of the inner peripheral section 167 and is deformed.

An operation of the present embodiment will now be described. When a comparatively small vibration is input to the main fluid chamber 120, the internal pressure increases in response to the input of this vibration to push the body section 150 of the elastic membrane 127 downward from the top side of FIG. 12. Since the body section 150 is provided on the central section thereof with the curved groove 151 parallel to the long side section 157, in the cross-section of the short side section of FIGS. 12 and 14, the body section 150 is sheared to bend using the curved groove 151 as a fulcrum.

Accordingly, although the long side section 157 is linearly secured to the partition member 116 side over the long area, the elastic membrane 127 easily undergoes elastic deformation in response to the increase of internal pressure of the main fluid chamber 120 to absorb the increase of the internal pressure, wherein the low dynamic spring effect can be realized.

Further, each end of the stopper projections 152, 152 in the longitudinal direction is provided as a free end, and the stopper projection 152 is not formed on the side of the short side section to provide a discontinuous shape. It is therefore easier to bend the elastic membrane in the direction of the short side section 158.

Since the upper section of the peripheral wall 156 is pushed to open outward by the slope 163 of the inner peripheral section 162, the initial spring constant of the elastic membrane 127 becomes large. By providing the clearance 164, when the body section 150 is elastically deformed, the elastic deformation can be further promoted by means of the elastic deformation of the peripheral wall 156.

If larger vibrations are further input, the ends of the stopper projections 152, 152 open in opposite directions. As a result, the abutting slope 153 first abuts against the step section 168 of the inner peripheral section 167 to elastically deform the end of the stopper projection 152, thereby increasing the spring constant of the elastic membrane 127.

If the elastic membrane 127 undergoes further elastic deformation, the stopper projections 152, 152 are pushed to the narrow section of the inner peripheral section 167 for further elastic deformation, thereby increasing the spring constant further.

Accordingly, when large vibrations are input, the spring constant is also non-linearly changed in proportion to the magnitude of the vibration. By increasing the spring constant, the quantity of flow flowing into the damping orifice passage 123 is increased to generate fluid column resonance in the damping orifice passage 123, wherein a larger damping force is generated and the vibration is thus absorbed.

Figure 17:
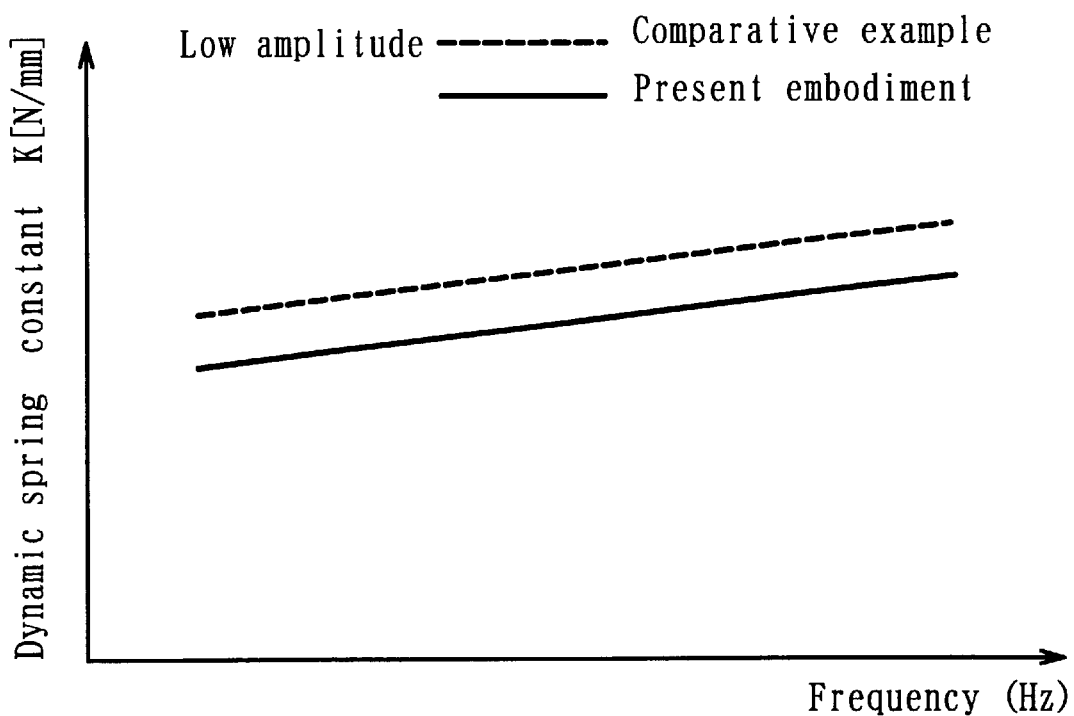
FIG. 17 is a graph showing dynamic spring characteristics in the case of a low amplitude.
Figure 18:
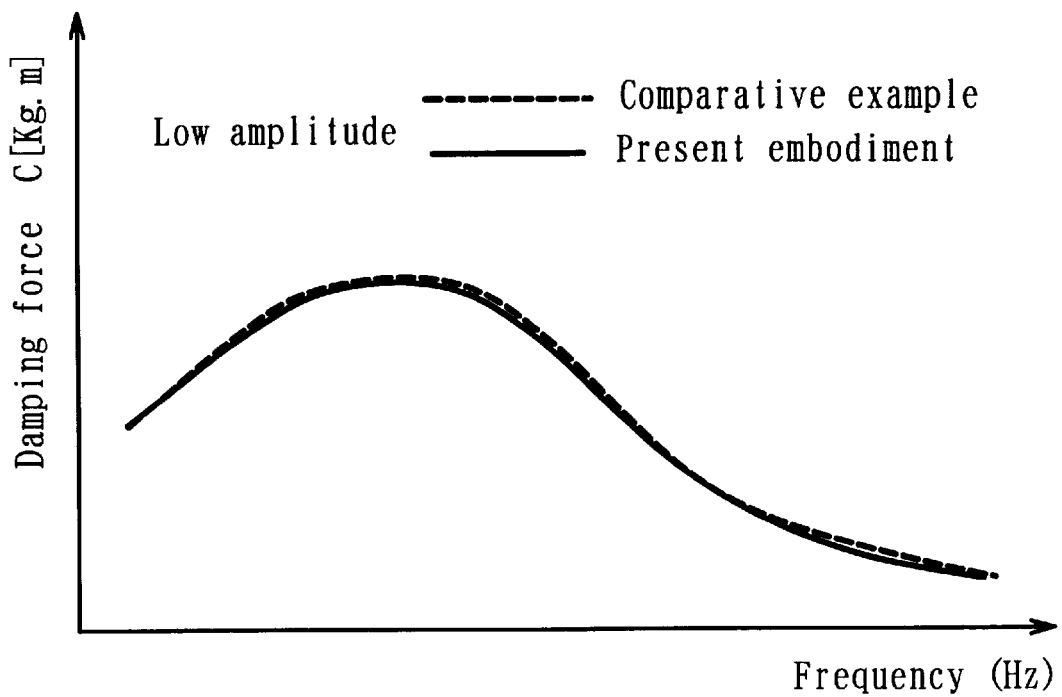
FIG. 18 is a graph showing damping characteristics in the case of large amplitude.

FIG. 17 is a graph showing the relation between the dynamic spring constant and the frequency in the case of a small amplitude and FIG. 18 is a graph showing damping characteristics in the case of a large amplitude, wherein a solid line shows the present embodiment, while a broken line shows a comparative example in which the same oval shape as the present embodiment is utilized, but the curved groove 151 is not provided and the stopper projection is formed circularly. FIG. 17 shows that the present embodiment can realize a remarkable low dynamic spring effect and FIG. 18 shows that almost the same high damping as the prior art can be realized.

As is obvious from these graphs, a low dynamic spring effect in proportion to a small vibration input can be realized. Also, a comparatively large damping force can be generated in proportion to a large vibration input to realize more or less the same high damping as the prior art. It is therefore possible to obtain an ideal low dynamic spring effect and high damping characteristics.

Further, even though the partition member 116 is horizontally provided with three passages of the damping orifice passage 123, the idle orifice passage 125, and the orifice hall 126, if the elastic membrane 127 provided in the orifice hall 126 is formed as an oval, non-circular member, it is possible to arrange the elastic membrane 127 even in difficult layout conditions in which a circular elastic membrane 127 can not be provided.

What is claimed is:

1. A fluid-sealed anti-vibration device for insulating a car body from a source of vibration, comprising:

a first connecting member for securing to the source of vibration;

a second connecting member for securing to the car body;

a substantially cone-shaped elastic body member positioned therebetween, the elastic body member further extending downward along a cylindrical inner surface of a side wall to form an inner lining section enclosing a main fluid chamber, wherein said main fluid chamber is formed by the first connecting member, the second connecting member, and the elastic body member, and wherein said main fluid chamber is separated by a partition member from a sub-fluid chamber beneath the main fluid chamber;

an orifice formed in the partition member to communicate with the main fluid chamber and the sub-fluid chamber;

a plurality of horizontally movable membranes integrally formed at intervals in the inner lining section of the elastic body, each of the plurality of horizontally moving membranes facing a circular hole in the side wall; and a circular control wall provided in the main fluid chamber, the circular control wall facing the plurality of horizontally movable membranes.

2. The fluid-sealed anti-vibration device for insulating a car body from a source of vibration according to claim 1, wherein the control wall is formed integrally with or separately from the partition member.

3. The fluid-sealed anti-vibration device for insulating a car body from a source of vibration according to claim 1, wherein an eigen value of each of the plurality of horizontally movable membranes is changed.

4. The fluid-sealed anti-vibration device for insulating a car body from a source of vibration according to claim 1, wherein said circular wall is formed inside the side wall member to face the side wall member and the plurality of horizontally movable membranes integrally formed therein at intervals, and wherein space provided between the circular control wall and the side wall member opens to the main fluid chamber.

5. The fluid-sealed anti-vibration device for insulating a car body from a source of vibration according to claim 1, wherein an elastic membrane is provided on the partition member, adapted to be elastically deformed as a result of internal pressure in the main fluid chamber and formed as a non-circular member with a long side section and a short side section and provided in the central part thereof with a curved groove running substantially parallel to the long side section.

6. The fluid-sealed anti-vibration device for for insulating a car body from a source of vibration according to claim 5, wherein the elastic membrane is integrally provided with a stopper projection on the reverse side of and substantially parallel to the curved groove, and the stopper projection is formed only on the long side section of the elastic membrane.

7. The fluid-sealed anti-vibration device for insulating a car body from a source of vibration according to claim 5, wherein a periphery of the elastic membrane is integrally formed with a continuous circular peripheral wall that is retained by a retaining section of the partition member, and a clearance is provided at the retaining section by the partition member to permit deformation of the peripheral wall.

8. The fluid-sealed anti-vibration device for for insulating a car body from a source of vibration according to claim 5, wherein the partition member is provided with the first to third orifice passages, of which the first orifice passage is the damping orifice passage for always communicating with the main fluid chamber and the sub-fluid chamber, the second orifice passage can be freely opened and closed, and the third orifice passage, of which part is covered by the elastic membrane which is elastically deformable to shut off the communication with the main fluid chamber and the sub-fluid chamber, and the elastic membrane is formed as the non-circular member.

\* \* \* \* \*